(12) United States Patent
Wang et al.

(10) Patent No.: US 12,553,848 B2
(45) Date of Patent: Feb. 17, 2026

(54) SYSTEMS AND METHODS FOR ELECTROLYTE QUALITY INSPECTION AND MONITORING

(71) Applicant: GM GLOBAL TECHNOLOGY OPERATIONS LLC, Detroit, MI (US)

(72) Inventors: Chuanlong Wang, Troy, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 18/414,734

(22) Filed: Jan. 17, 2024

(65) Prior Publication Data

US 2025/0231135 A1    Jul. 17, 2025

(51) Int. Cl.
*G01N 27/24* (2006.01)

(52) U.S. Cl.
CPC .................................... *G01N 27/24* (2013.01)

(58) Field of Classification Search
CPC .. G01R 31/36; G01R 31/392; G01R 31/3865; G01R 31/389
USPC ......................................................... 324/432
See application file for complete search history.

(56) References Cited

U.S. PATENT DOCUMENTS

| | | | |
|---|---|---|---|
| 2003/0024319 A1* | 2/2003 | Pistorius | G01L 9/0072 73/718 |
| 2004/0149032 A1* | 8/2004 | Sell | G01F 23/268 73/304 C |
| 2012/0118727 A1* | 5/2012 | McDugle | F02D 19/0607 204/237 |
| 2014/0208822 A1* | 7/2014 | Ferran | G01L 27/002 73/1.15 |
| 2015/0315720 A1* | 11/2015 | Mayer | C25D 21/18 204/232 |
| 2017/0077488 A1* | 3/2017 | Yadgar | H01M 50/673 |
| 2021/0370356 A1* | 12/2021 | MacKay | G01F 23/263 |
| 2025/0122631 A1* | 4/2025 | Macfarlane | C25B 1/50 |

FOREIGN PATENT DOCUMENTS

EP    4254590 A1    10/2023

OTHER PUBLICATIONS

Han, Ji Yun et al., "Impact of water on toxic hydrogen fluoride generation from the decomposition of LiPF6 in lithium-ion battery electrolytes." Oct. 2019.

(Continued)

*Primary Examiner* — Roberto Velez

(57) ABSTRACT

A system for monitoring the quality of electrolyte for a battery cell includes a reservoir configured to receive electrolyte, a capacitive sensor disposed in the reservoir, and a control module in communication with the capacitive sensor. The capacitive sensor is configured to sense a capacitance of the electrolyte when received in the reservoir. The control module is configured to receive a signal from the capacitive sensor indicative of the capacitance of the electrolyte, and determine whether the received electrolyte is contaminated based on the capacitance of the electrolyte and a defined threshold. Other example systems and methods for monitoring the quality of electrolyte for battery cells are also disclosed.

20 Claims, 7 Drawing Sheets

(56) References Cited

OTHER PUBLICATIONS

Hall, David S. et al., "Dielectric Constants for Quantum Chemistry and Li—Ion Batteries: Solvent Blends of Ethylene Carbonate and Ethyl Methyl Carbonate." The Journal of Physical Chemistry. Sep. 2015.
German Office Action from counterpart DE1020241055510, dated Sep. 19, 2024.

* cited by examiner

SYSTEMS AND METHODS FOR ELECTROLYTE QUALITY INSPECTION AND MONITORING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to the inspection and monitoring of electrolytes for battery cells.

Vehicles such as electric vehicles (EVs) include a battery system having one or more battery cells to power various aspects of the vehicles. The battery cells include solid or liquid electrolyte arranged between one or more cathode electrodes and one or more anode electrodes. The battery cells including their components may be inspected for quality verification measures. This typically takes place at the end of the battery cell manufacturing line.

SUMMARY

A system for monitoring the quality of electrolyte for a battery cell includes a reservoir configured to receive electrolyte, a capacitive sensor disposed in the reservoir, and a control module in communication with the capacitive sensor. The capacitive sensor is configured to sense a capacitance of the electrolyte when received in the reservoir. The control module is configured to receive a signal from the capacitive sensor indicative of the capacitance of the electrolyte, and determine whether the received electrolyte is contaminated based on the capacitance of the electrolyte and a defined threshold.

In other features, the defined threshold is a capacitance range, and the control module is configured to determine the received electrolyte is contaminated in response to the capacitance of the electrolyte being outside the capacitance range.

In other features, the system further includes a temperature sensor disposed in the reservoir. The temperature sensor is configured to sense a temperature of the electrolyte when received in the reservoir. The control module is configured to receive a signal from the temperature sensor indicative of the temperature of the electrolyte, and select the defined threshold from a plurality of thresholds based on the temperature of the electrolyte.

In other features, the capacitive sensor is a first capacitive sensor, and the system further comprises a second capacitive sensor disposed in the reservoir and configured to sense a capacitance of the electrolyte In other features, the control module is configured to receive a signal from the second capacitive sensor indicative of the capacitance of the electrolyte, and determine whether the received electrolyte is contaminated based on the capacitance received from the first capacitive sensor, the capacitance received from the second capacitive sensor, and the defined threshold.

In other features, the control module is configured to determine whether the received electrolyte is contaminated based on the defined threshold and an average of the capacitance received from the first capacitive sensor and the capacitance received from the second capacitive sensor.

In other features, the system further includes an electrolyte position sensor disposed in the reservoir and configured to sense the electrolyte in the reservoir. The control module is configured to receive a signal from the electrolyte position sensor indicative of a level of the electrolyte in the reservoir.

In other features, the system further includes a mixing device disposed in the reservoir. The mixing device is configured to agitate the electrolyte when received in the reservoir.

In other features, the system further includes an electrolyte injector in fluid communication with the reservoir. The electrolyte injector is configured to inject the electrolyte into one or more battery cells if the control module determines that the received electrolyte is not contaminated.

In other features, the control module is configured to monitor the capacitance of the electrolyte over a period of time and determine whether the received electrolyte is contaminated based on the capacitance of the electrolyte over the period of time and the defined threshold.

In other features, the capacitive sensor includes two parallel electrodes.

In other features, the capacitive sensor includes two coplanar electrodes.

In other features, the reservoir is an electrically grounded tank.

In other features, the tank is formed of stainless-steel.

A method for monitoring the quality of electrolyte in a reservoir includes receiving electrolyte in a reservoir, sensing, with a capacitive sensor disposed in the reservoir, a capacitance of the electrolyte, and determining whether the received electrolyte is contaminated based on the capacitance of the electrolyte and a defined threshold.

In other features, the defined threshold is a capacitance range, and determining whether the received electrolyte is contaminated includes determining the received electrolyte is contaminated in response to the capacitance of the electrolyte being outside the capacitance range.

In other features, the method further includes sensing, with a temperature sensor disposed in the reservoir, a temperature of the electrolyte, and selecting the defined threshold from a plurality of thresholds based on the temperature of the electrolyte.

In other features, the capacitive sensor is a first capacitive sensor, the method further includes sensing, with a second capacitive sensor disposed in the reservoir, a capacitance of the electrolyte, and determining whether the received electrolyte is contaminated includes determining whether the received electrolyte is contaminated based on the defined threshold and an average of the capacitance received from the first capacitive sensor and the capacitance received from the second capacitive sensor.

In other features, the method further includes sensing, with an electrolyte position sensor disposed in the reservoir, a level of the electrolyte in the reservoir.

In other features, the method further includes agitating, with a mixing device, the electrolyte in the reservoir.

In other features, the method further includes injecting the electrolyte into one or more battery cells if the received electrolyte is determined to be not contaminated.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Battery cells include electrolyte arranged between one or more cathode electrodes and one or more anode electrodes. The battery cells may be employed in vehicle applications and/or any other suitable application for powering various aspects thereof. With respect to vehicle applications, increasing production yields and volumes of vehicle battery cells being manufactured drives a need for improved battery cell quality verification measures. In various embodiments, quality verification of the vehicle battery cells may take place at the end of the battery cell manufacturing line, where significant time and materials have been invested in making the battery cells regardless of whether they are conforming or non-conforming to industry standards. For example, electrolyte used in battery cells (e.g., for vehicle applications or other suitable applications) may be determined to be faulty and therefore fail quality inspections after the battery cells are assembled. This results in a significant loss of time and materials.

The systems and methods according to the present disclosure provide solutions for accurately and efficiently inspecting and monitoring the quality of electrolyte for battery cells before the electrolyte is provided for use in the battery cells. As further explained herein, the systems and methods rely on capacitance measurements of the electrolyte to determine whether the electrolyte is contaminated or not before the electrolyte is injected or otherwise provided to the battery cells. In doing so, the systems and methods can determine whether the electrolyte is suitable for use (e.g., pass or fail quality inspections) early in the battery cell manufacturing line, thereby saving significant time and materials.

Figure 1:
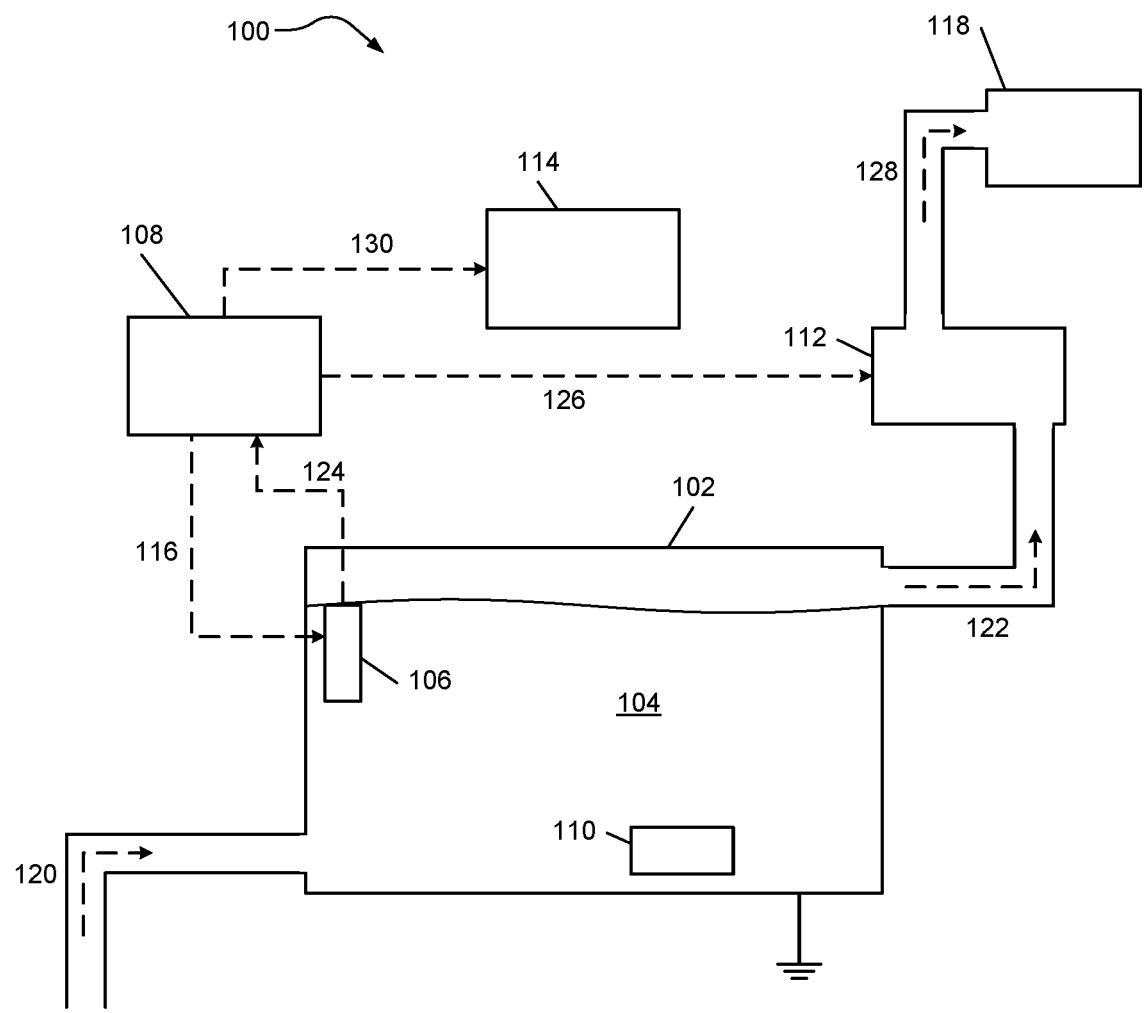
FIG. 1 is a functional block diagram of an example system including a capacitive sensor for monitoring the quality of electrolyte for a battery cell, according to the present disclosure.

Referring now to FIG. 1, a block diagram of an example system 100 is presented for inspecting and monitoring the quality of electrolyte for battery cells. The inspection and monitoring system 100 and/or any of the other example systems and methods herein may be applicable in the manufacturing of battery cells for vehicle applications and/or any other suitable application for powering various aspects associated therewith.

The inspection and monitoring system 100 generally includes a reservoir 102 for receiving electrolyte 104, a capacitive sensor 106, and a control module 108 in communication with the capacitive sensor 106. Additionally, the system 100 may optionally include a mixing device 110, an electrolyte injector 112, and/or an alert module 114 as shown in FIG. 1.

As shown in FIG. 1, the capacitive sensor 106 is generally disposed in the reservoir 102. More specifically, the capacitive sensor 106 may be positioned within an interior of the reservoir 102 and immersed in the electrolyte 104. In such examples, the capacitive sensor 106 may be attached to a wall (e.g., an interior facing side) of the reservoir 102, suspended in a manner to allow immersion into the electrolyte 104, etc.

Figure 5:
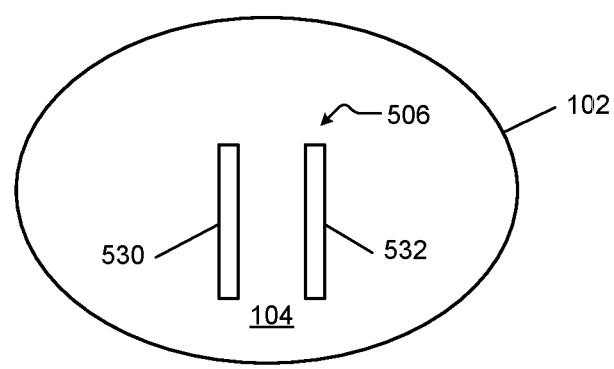
FIGS. 5-6 are functional block diagrams of example capacitive sensors, according to the present disclosure.
Figure 6:
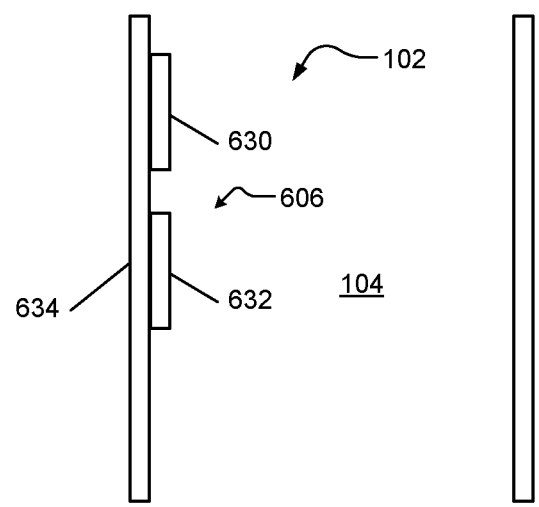

In the example of FIG. 1, the capacitive sensor 106 may be any suitable type of sensing device. For example, the capacitive sensor 106 may have a pair of electrodes (e.g., electrically conductive plates, etc.). In such examples, the electrodes may be platinum plates each having any suitable surface area (e.g., ranging between about 900 mm$^2$ and about 1100 mm$^2$) and any suitable distance therebetween (e.g., ranging between about 2 and about 5 mm). In various embodiments, the electrodes may extend in parallel planes (e.g., facing each other) or a single plane (e.g., coplanar). For instance, FIGS. 5-6 depict examples of capacitive sensors 506, 606 employable as the capacitive sensor 106 and/or as any other capacitive sensor herein. In FIGS. 5-6, each capacitive sensor 506, 606 is disposed in a reservoir (e.g., the reservoir 102 of FIG. 1) having electrolyte (e.g., the electrolyte 104). In such examples, the capacitive sensor 506 of FIG. 5 includes two parallel electrodes 530, 532 immersed in the electrolyte 104. The capacitive sensor 606 of FIG. 6 includes two coplanar electrodes 630, 632 immersed in the electrolyte 104 and attached to a wall 634 of the reservoir 102.

Referring back to FIG. 1, the capacitive sensor 106 senses a capacitance of the electrolyte 104. For example, the capacitive sensor 106 receives an AC voltage signal 116 having a frequency, and then senses the capacitance of the electrolyte 104 In such examples, the AC voltage signal 116 may be provided by the control module 108 as shown in FIG. 1 or from an AC power supply controlled by the control module 108. The frequency may be any suitable value depending on, for example, the electrolyte 104 and possible contaminants therein. For example, the frequency may be large (e.g., about 2.4 MHz, etc.) or relatively small (e.g., about 1 kHz, etc.) to better amplify capacitive differences in different electrolytes. In such examples, an optimal frequency for detection of a Li+ concentration in the electrolyte (e.g., a chloride solution) may be about 2.4 MHz. In other examples, an optimal frequency for detection of possible contaminants such as water ($H_2O$) and/or hydrogen fluoride (HF) may be about 1 kHz.

With continued reference to FIG. 1, the reservoir 102 may be any suitable device for receiving and containing the electrolyte 104. For example, and as shown in FIG. 1, the reservoir 102 may be a tank that is electrically grounded for shielding purposes. In such examples, the reservoir 102 may include a wire extending therefrom that is electrically connected to ground. Additionally, the reservoir 102 may be formed of any suitable materials, such as stainless-steel, etc.

In various embodiments, the reservoir 102 (and more generally the system 100) may be part of or associated with a battery cell fabrication process. In such examples, the system 100 is effectively in line with a battery cell manufacturing line such that the electrolyte 104 flows through the reservoir 102 for inspection purposes before possibly being injected into one or more battery cells 118, as further explained herein. For example, and as shown in FIG. 1, the electrolyte 104 is generally input into (e.g., received by) the reservoir 102 and output from the reservoir 102 as indicated by dashed arrows 120, 122. Such flow may be accomplished through one or more pumps, gravity, etc.

The mixing device 110 of FIG. 1 is generally disposed in the reservoir 102 and immersed in the electrolyte 104 when the electrolyte 104 is received. In such examples, the mixing device 110 may be positioned in any suitable location within the reservoir 102, such as near the bottom as shown in FIG. 1, near a middle portion of the reservoir 102, etc. The mixing device 110 may be any suitable device (e.g., an auger, movable blades, etc.) for agitating the electrolyte 104 in the reservoir 102. With this configuration, the electrolyte 104 in the reservoir 102 may be mixed to ensure a substantially homogeneous mixture. In other words, the mixing device 110 ensures the electrolyte substance near the bottom of the reservoir 102 is substantially the same as the electrolyte substance near the top of the reservoir 102. In such examples, the mixing device 110 may be operated continuously or controlled (e.g., by the control module 108) to intermittently operate.

With continued reference to FIG. 1, the control module 108 is generally configured to inspect and monitor the quality of the electrolyte 104 for downstream battery cells. For example, after the reservoir 102 receives a sufficient amount of the electrolyte 104 (or another batch of electrolyte), the control module 108 receives a signal 124 from the capacitive sensor 106 indicative of the capacitance of the electrolyte 104.

Then, the control module 108 determines whether the received electrolyte 104 is contaminated based on the capacitance of the electrolyte 104 and a defined threshold. For example, the control module 108 may compare the capacitance of the electrolyte 104 to the defined threshold to determine whether the electrolyte 104 is sufficiently contaminated and fails a quality inspection or is not sufficiently contaminated and passes the quality inspection. In such examples, the capacitance of the electrolyte 104 differs based on the materials contained therein.

For instance, different materials generally have different dielectric constants indicating the extent to which they can store an electrical charge. For example, the dielectric constant of water is 78.39 while the dielectric constant of hydrogen fluoride is 84. Because the permittivity of a material is based on its dielectric constant, a permittivity of one material may be different than a permittivity of another material. For instance, the dielectric constant (k) of a material is the ratio of its permittivity (E) to the permittivity ($\varepsilon_0$) of vacuum, as shown by equation (1) below. The capacitance (C) of the material (e.g., the electrolyte 104) may be determined based on the permittivity ($\varepsilon$) of the material, an area (A) of an electrode, and a distance (d) between the two electrodes, as indicated by equation (2) below. As such, if the area (A) of the electrode and the distance (d) between the two electrodes is constant, the capacitance (C) and the permittivity (or dielectric constant) are directly related. With this, the sensed capacitance may then be used to determine whether the electrolyte 104 is contaminated with one or more other materials (e.g., $H_2O$, HF, etc.) as the capacitance will change due to the dielectric constants of the other materials.

$$k = \frac{\varepsilon}{\varepsilon_0} \qquad \text{Equation (1)}$$

$$C = \frac{\varepsilon \times A}{d} = \frac{K\varepsilon_0 A}{d} \qquad \text{Equation (2)}$$

In various embodiments, the defined threshold may be a capacitance range. For example, the defined threshold may range by a certain amount (e.g., a percent error) from a desired value. For instance, the defined threshold may range by plus and minus a defined amount (e.g., 0.02 µF, 0.03 µF, 0.04 µF, 0.05 µF, 0.06 µF, etc.) from a desired value (e.g., 2.90, µF, 2.91 µF, 2.94 µF, 2.96 µF, 2.97 µF, 2.98 µF, etc.). In such examples, the control module 108 may determine that the electrolyte 104 is contaminated in response to the capacitance of the electrolyte 104 being outside the capacitance range. Alternatively, the control module 108 may determine that the electrolyte 104 is not contaminated in response to the capacitance of the electrolyte 104 being within (or meeting) the capacitance range.

Testing has shown that even trace amounts of contaminants may be detected based on the capacitance measurements. As examples only, a capacitive sensor (e.g., the capacitive sensor 506 of FIG. 5, etc.) may include two parallel electrodes each having an area (A) of 20 mm$^2$ and a distance (d) therebetween of 8 mm. In this example, the capacitive sensor is immersed in electrolyte having 1M lithium hexafluorophosphate (LiPF$_6$) in Ethylene Carbonate (EC):Dimethyl carbonate (DMC) 3:7 (volume ratio)+1 wt % lithium difluoro (oxalato) borate (LiDFOB). While the particular example provides for a specific volume ratio for EC:DMC and a specific weight percentage of LiDFOB, it should be appreciated that such parameters may be modified as desired.

The capacitance measurement for this electrolyte (e.g., fresh electrolyte) may be about 2.96 µF. This capacitance may fall within a defined threshold range or otherwise meet a defined threshold (e.g., a baseline or established capacitance value) for the particular electrolyte composition, thereby allowing the electrolyte to pass a quality inspection. However, when a trace amount of water (e.g., 1000 ppm, 0.1%) is introduced into the electrolyte, the capacitance measurement increases to about 3.039 µF. Additionally, when a salt concentration (e.g., 1.5M) is introduced into the electrolyte, the capacitance measurement decreases to about 2.575 µF. These increased and reduced capacitances may fall outside the defined threshold range or otherwise not meet the defined threshold for the particular electrolyte composition, thereby causing the electrolyte to fail a quality inspection.

In various embodiments, the sensitivity for capacitance measurements may be improved. For example, to improve sensitivity for lower water levels (e.g., around 100 ppm), electrodes with a larger area (A) and shorter distance (d) therebetween may be employed in the capacitive sensor. An example area (A) may be 1,000 mm$^2$ and an example distance (d) may be 2 mm.

With continued reference to FIG. 1, the electrolyte injector 112 is in fluid communication with the reservoir 102. In this example, the electrolyte injector 112 may inject the electrolyte 104 into the battery cell(s) 118, as indicated by dashed arrow 128. Such flow may be accomplished through one or more pumps, gravity, etc.

For example, if the control module 108 determines that the received electrolyte 104 (or another batch of electrolyte) is not contaminated (e.g., the electrolyte 104 passes a quality inspection) based on the capacitance measurement from the capacitive sensor 106 and a defined threshold, the electrolyte injector 112 may inject the electrolyte 104 into the battery cell(s) 118. In various embodiments, the control module 108 may provide a signal 126 to the electrolyte injector 112 to activate a pump, open a valve, etc. to allow the electrolyte 104 to flow towards the battery cell(s) 118. If, however, the control module 108 determines that the received electrolyte 104 is contaminated (e.g., the electrolyte 104 fails a quality inspection) based on the capacitance measurement from the capacitive sensor 106 and a defined threshold, the electrolyte injector 112 may be prevented from passing the contaminated electrolyte into the battery cell(s) 118 (e.g., via the signal 126) and/or the contaminated electrolyte may be expelled from the reservoir 102.

In various embodiments, the capacitance of the electrolyte 104 may be monitored over a period of time. In such examples, the capacitance may be monitored continuously, periodically, or randomly over the period of time. For example, the control module 108 may receive capacitance measurements from the capacitive sensor 106. In some examples, the control module 108 may chart the capacitance of the electrolyte 104 over time and monitor any profile trends of the capacitance. For example, the capacitance of the electrolyte 104 may change and eventually fall within the defined threshold range or otherwise meet the defined threshold for a particular electrolyte composition. In other examples, the capacitance of the electrolyte 104 may trend away from the defined threshold. In such examples, the electrolyte 104 may be discarded, replaced, etc.

In some examples, the alert module 114 may be in communication with the control module 108 as shown in FIG. 1. In such examples, the control module 108 may transmit a signal 130 to the alert module 114. In various embodiments, the signal 130 may be indicative of the electrolyte 104 passing or failing a quality inspection, of further analysis of the electrolyte 104 is required, etc. Once the signal 130 is received, the alert module 114 may provide one or more visual alerts (e.g., on a display of the alert module 114), audible alerts (e.g., from a speaker of the alert module 114), etc. to indicate the electrolyte 104 passing or failing a quality inspection and/or if further analysis is required.

Figure 2:
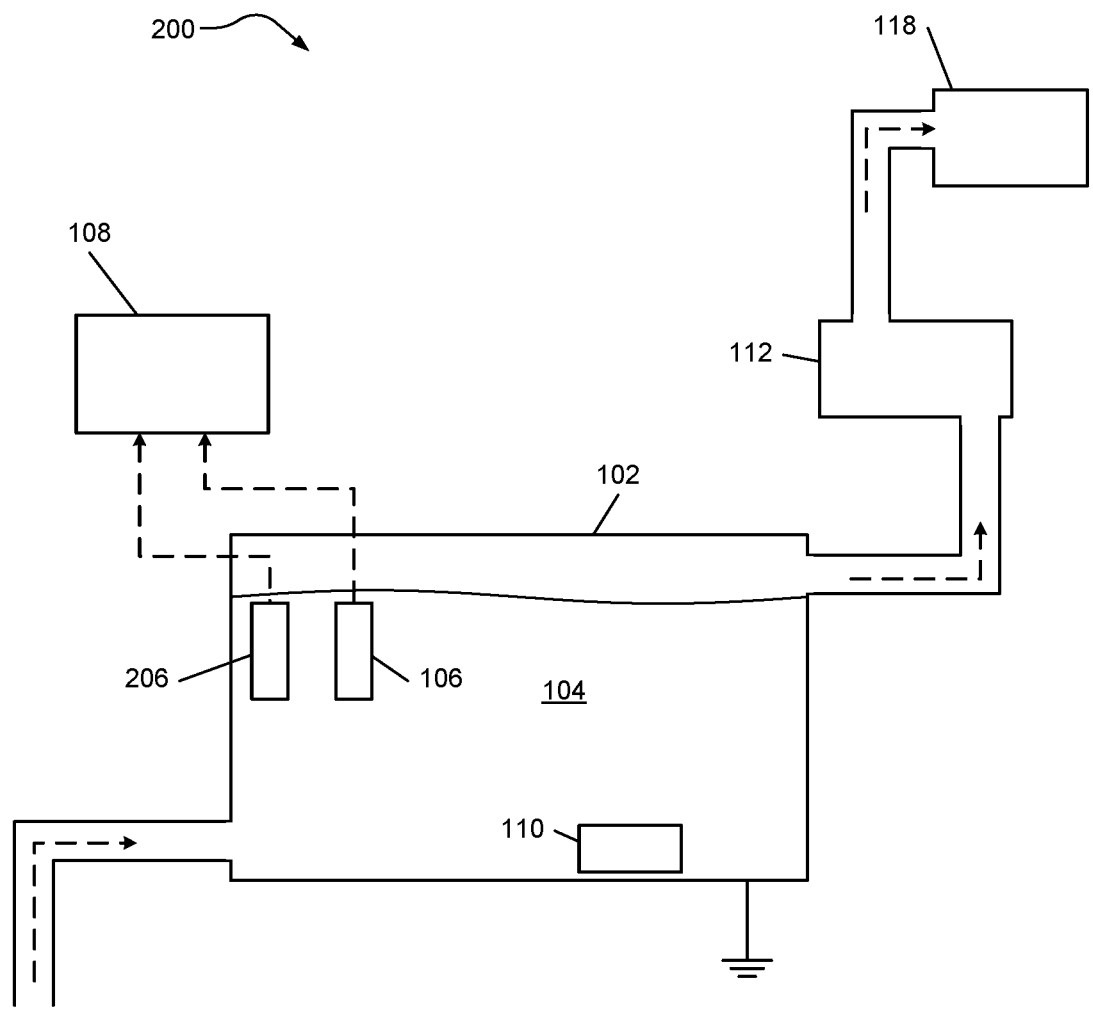
FIG. 2 is a functional block diagram of an example system including two capacitive sensors for monitoring the quality of electrolyte for a battery cell, according to the present disclosure.

In various embodiments, the system 100 and/or other systems herein may employ multiple capacitive sensors for determining whether electrolyte is contaminated or not before the electrolyte is injected or otherwise provided to battery cells. For example, FIG. 2 depicts a system 200 that is substantially similar to the system 100 of FIG. 1 but includes two capacitive sensors. While the example system 200 of FIG. 2 is shown as including two capacitive sensors, it should be appreciated that in other embodiments the system 200 may include three or more capacitive sensors if desired.

As shown in FIG. 2, the system 200 generally includes the reservoir 102 for receiving the electrolyte 104, the capacitive sensor 106, the control module 108, the mixing device 110, and the electrolyte injector 112 of FIG. 1, and a capacitive sensor 206. The capacitive sensor 206 of FIG. 2 may be similar to or different than the capacitive sensor 106 of FIG. 1. For example, both capacitive sensors may have a similar configuration (e.g., two parallel electrodes or two coplanar electrodes) or different configurations.

In the example of FIG. 2, the capacitive sensor 206 is disposed in the reservoir 102 and immersed in the electrolyte 104 for sensing a capacitance of the electrolyte 104. In various embodiments, the capacitive sensor 206 may be located adjacent to the capacitive sensor 106 as shown in FIG. 2 or away from the capacitive sensor 106. For example, the capacitive sensors 106, 206 may be located at opposing sides of the reservoir 102, at top and bottom portions of the reservoir 102, etc.

In various embodiments, the control module 108 may determine whether the electrolyte 104 is contaminated or not based on the capacitance received from both capacitive sensors 106, 206. For example, and as shown in FIG. 2, the control module 108 may receive signals from the capacitive sensors 106, 206 indicative of different capacitance measurements of the electrolyte 104. Then, the control module 108 may determine whether the electrolyte 104 is contaminated based on the capacitance received from the capacitive sensor 106, the capacitance received from the capacitive sensor 206, and a defined threshold.

In some examples, the control module 108 may calculate statistical relationships of the different capacitance measurements of the electrolyte 104. For instance, the control module 108 may determine an average value of the capacitance received from the capacitive sensor 106 and the capacitance received from the capacitive sensor 206. Then, the control module 108 may determine whether the electrolyte 104 is contaminated based on the average capacitance of the electrolyte 104 and the defined threshold, as explained above.

Figure 3:
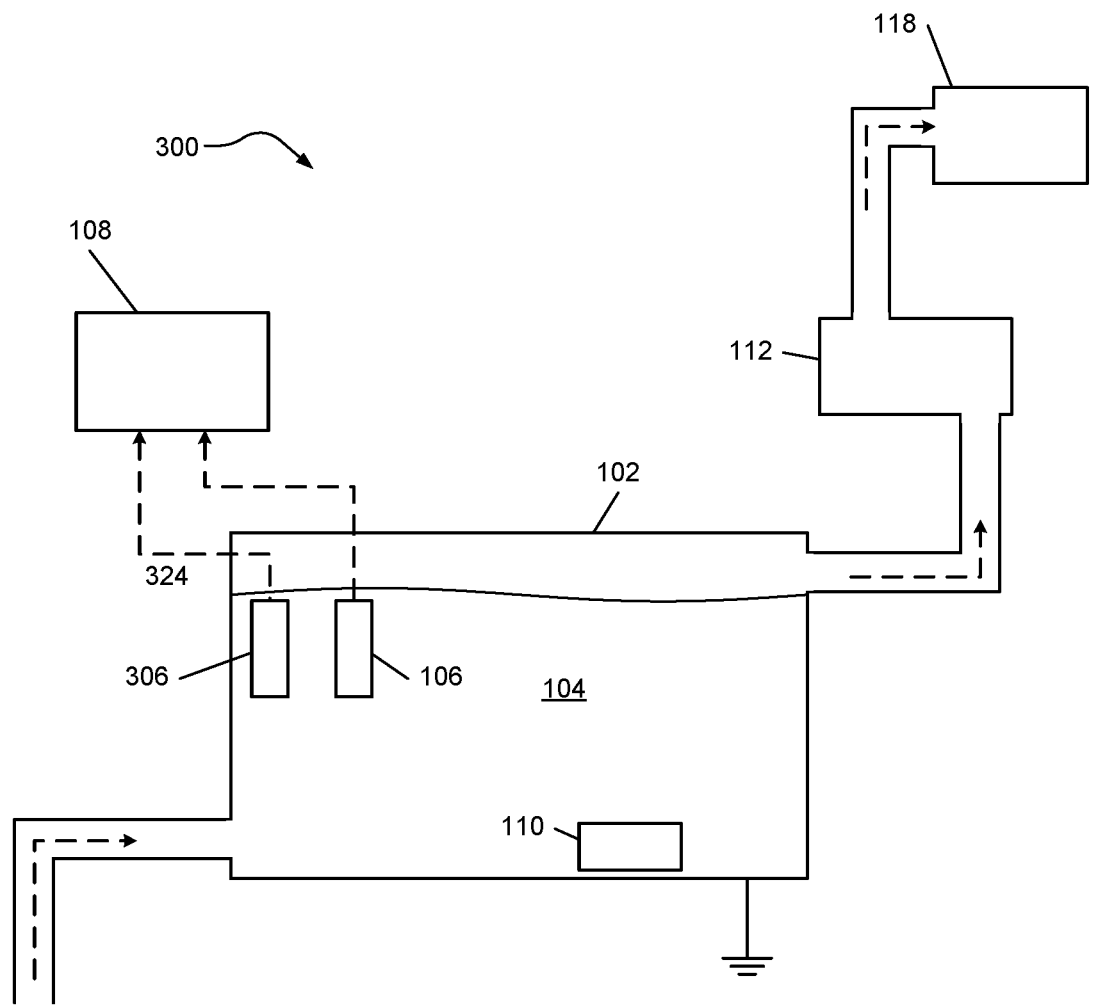
FIG. 3 is a functional block diagram of an example system including a capacitive sensor and a temperature sensor for monitoring the quality of electrolyte for a battery cell, according to the present disclosure.

In various embodiments, the system 100 and/or other systems herein may employ different types of sensors in addition to one or more capacitive sensors for determining whether electrolyte is contaminated or not before the electrolyte is injected or otherwise provided to battery cells. For example, FIG. 3 depicts a system 300 that is substantially similar to the system 100 of FIG. 1 but includes a temperature sensor. More specifically, the system 300 generally includes the reservoir 102 for receiving the electrolyte 104, the capacitive sensor 106, the control module 108, the mixing device 110, and the electrolyte injector 112 of FIG. 1, and a temperature sensor 306.

In the example of FIG. 3, the temperature sensor 306 is disposed in the reservoir 102 and immersed in the electrolyte 104 for sensing a temperature of the electrolyte 104. In various embodiments, the temperature sensor 306 may be located adjacent to the capacitive sensor 106 as shown in FIG. 3 or away from the capacitive sensor 106. For example, the capacitive sensor 106 and the temperature sensor 306 may be located at opposing sides of the reservoir 102, at top and bottom portions of the reservoir 102, etc.

In various embodiments, the control module 108 may determine whether the electrolyte 104 is contaminated or not based on a temperature of the electrolyte 104. For example, the dielectric constant of a material, such as the electrolyte 104 is temperature dependent. Thus, when the temperature of the electrolyte 104 changes, the dielectric constant of the electrolyte 104 may change resulting in a change in capacitance as explained above. In various embodiments, the dielectric constant of the material is inversely related to the temperature of that material. As such, to ensure a comparable basis comparison is achieved with respect to the sensed capacitance from the capacitive sensor 106, it may be beneficial to generate a defined threshold (e.g., a defined value, a defined range, etc.) for use in determining whether the electrolyte 104 is contaminated or not based on the temperature of the electrolyte 104.

For example, the control module 108 may receive a signal 324 from the temperature sensor 306 indicative of the temperature of the electrolyte 104. Then, based on the sensed or otherwise measured temperature of the electrolyte 104, the control module 108 can determine the defined threshold for use in determining whether the electrolyte 104 is contaminated or not. For instance, the control module 108 may select the defined threshold (e.g., a defined value, a defined range, etc.) from multiple thresholds based on the temperature of the electrolyte 104. In such examples, the available thresholds for selection may be determined based on capacitive testing of electrolyte (e.g., fresh electrolyte that is known to be adequate) at different temperatures, and stored in a memory circuit in or associated with the control module 108.

Figure 4:
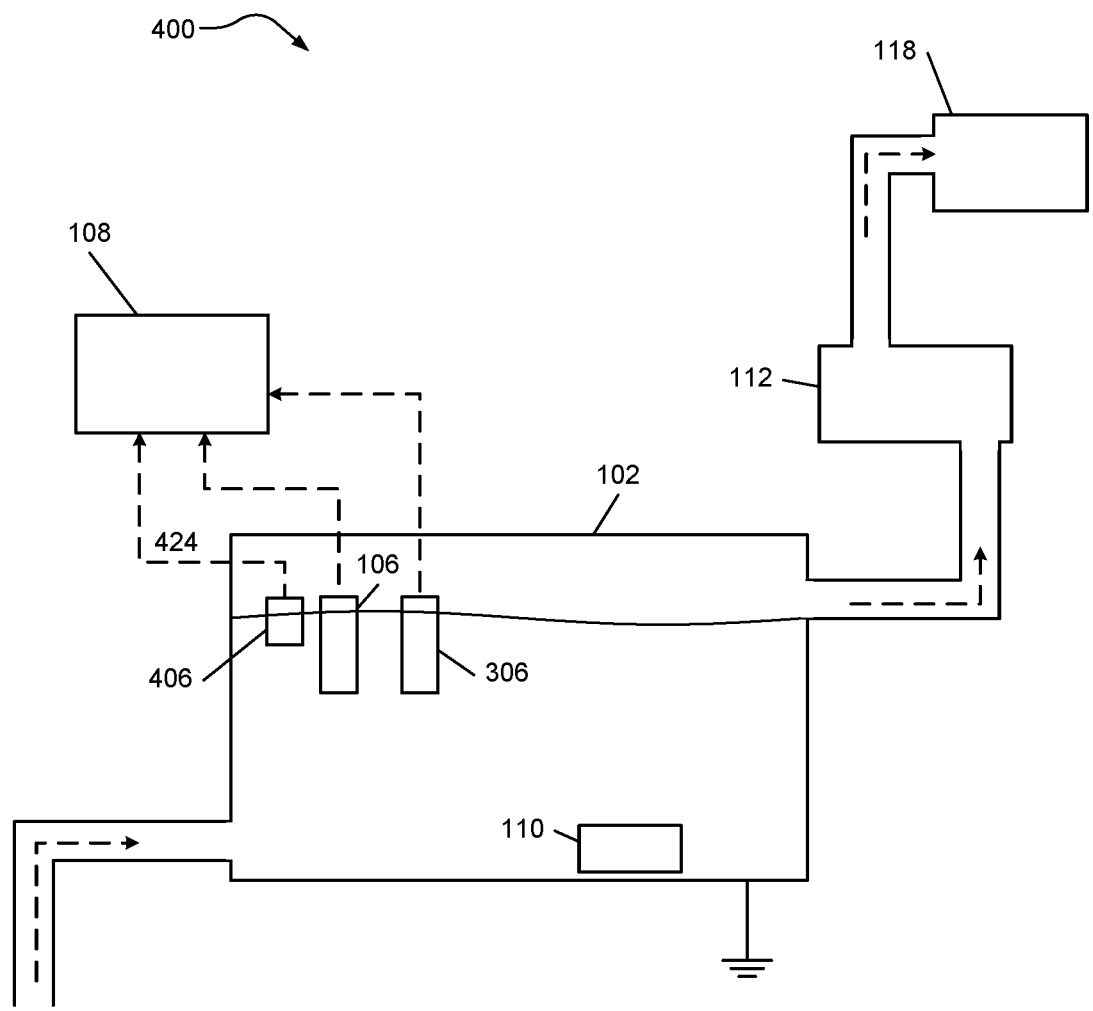
FIG. 4 is a functional block diagram of an example system including a capacitive sensor, a temperature sensor, and an electrolyte position sensor 406 for monitoring the quality of electrolyte for a battery cell, according to the present disclosure.

In various embodiments, the system 100 and/or other systems herein may employ other different types of sensors in addition to one or more capacitive sensors and/or temperature sensors for determining whether electrolyte is contaminated or not before the electrolyte is injected or otherwise provided to battery cells. For example, FIG. 4 depicts a system 400 that is substantially similar to the system 300 of FIG. 3 but includes an electrolyte position sensor. More specifically, the system 400 generally includes the reservoir 102 for receiving the electrolyte 104, the capacitive sensor 106, the temperature sensor 306, the control module 108, the mixing device 110, and the electrolyte injector 112 of FIGS. 1 and 3, and an electrolyte position sensor 406.

In the example of FIG. 4, the electrolyte position sensor 406 is disposed in the reservoir 102 for sensing the electrolyte 104. The electrolyte position sensor 406 may be any suitable type of device for sensing a level of the electrolyte 104. For example, the electrolyte position sensor 406 may be a liquid level sensor, a float, etc. In various embodiments, the electrolyte position sensor 406 may be located adjacent to the capacitive sensor 106 and the temperature sensor 306 as shown in FIG. 4 or in another suitable position away from the sensors 106, 306. For example, the electrolyte position sensor 406 may be located at an opposing side of the reservoir 102 as compared to the capacitive sensor 106 and/or the temperature sensor 306.

In various embodiments, the control module 108 may determine whether the electrolyte 104 is contaminated or not based on a characteristic sensed by the electrolyte position sensor 406. For example, the electrolyte position sensor 406 may function as a height sensor for detecting a level of the electrolyte 104 in the reservoir 102. In such examples, the control module 108 may receive a signal 424 from the electrolyte position sensor 406 indicative of a level of the electrolyte 104 in the reservoir 102. In doing so, the control module 108 may monitor the amount of electrolyte in the reservoir 102 to ensure each measurement from the capacitive sensor 106 is consistent with respect to the same electrolyte batch (e.g., the electrolyte 104) and/or from one batch of electrolyte to the next. For instance, to ensure consistency with electrolyte testing, it may be desirable to fill the same amount of electrolyte into the reservoir 102 to that an area value for the electrodes of the capacitive sensor 106 remains constant from each measurement.

Figure 7:
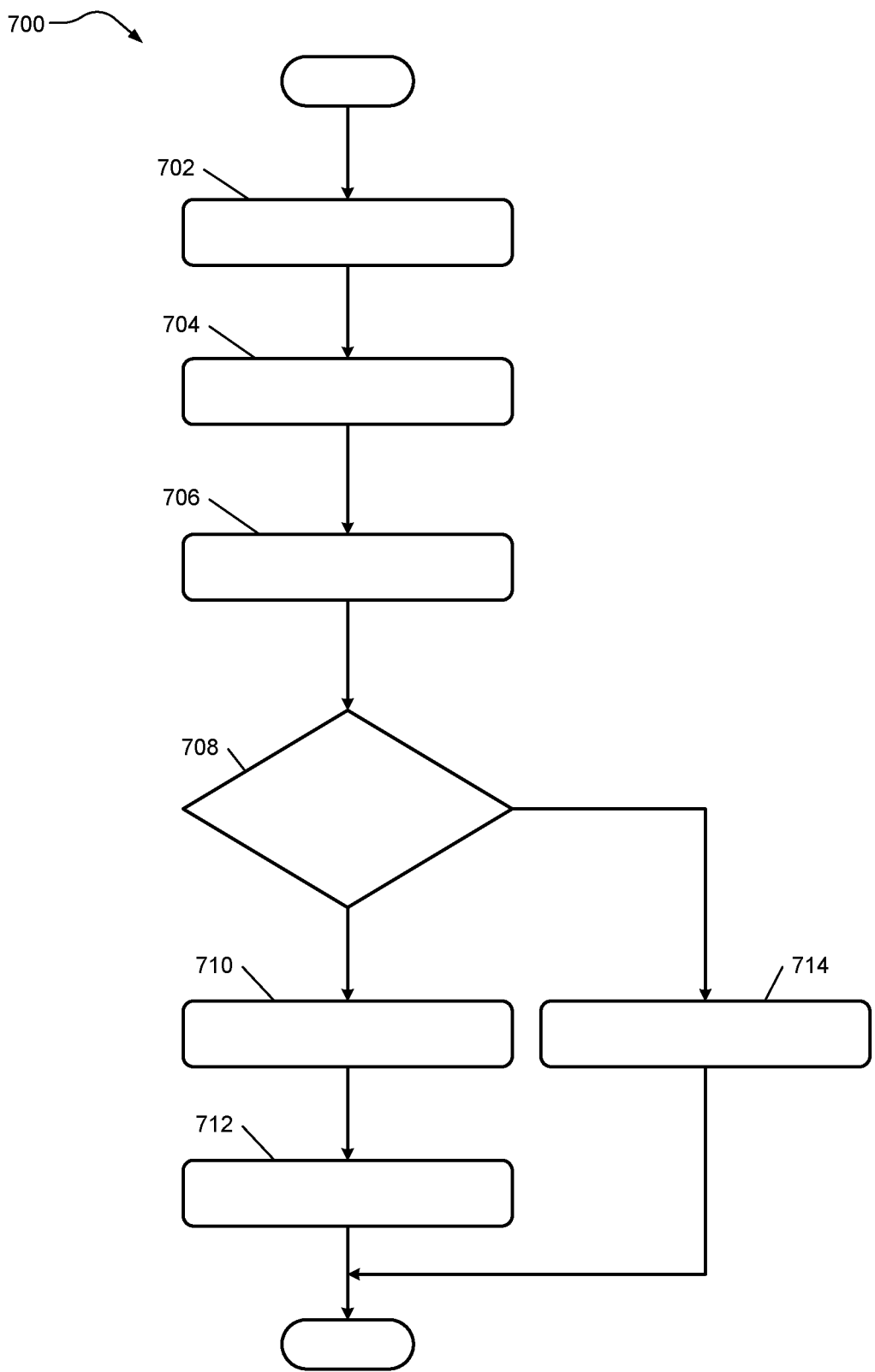
FIGS. 7-8 are flowcharts of example processes for monitoring the quality of electrolyte for a battery cell, according to the present disclosure.
Figure 8:
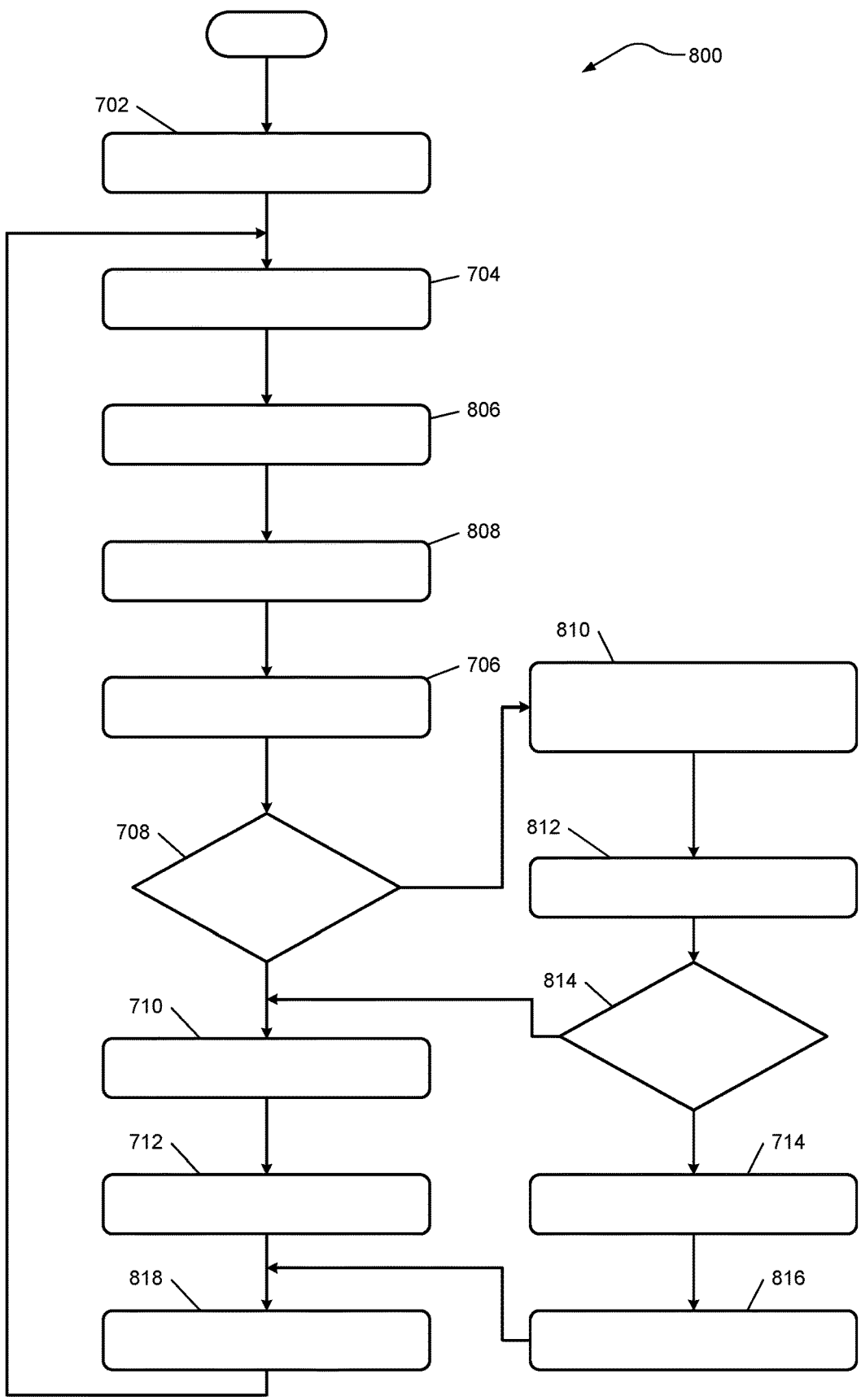

FIGS. 7-8 illustrate example processes 700, 800 for monitoring a quality of electrolyte for battery cells. While FIGS. 7-8 are shown and described as including specific steps, it should be appreciated that the processes 700, 800 of FIGS. 7-8 are example variations that may be implemented and in other embodiments the processes 700, 800 and/or other example processes may include different steps, more or less steps, etc. Additionally, although the example processes 700, 800 are described in relation to the systems 100, 200, 300, 400 of FIGS. 1-4, any one of the processes 700, 800 may be employable by any suitable system.

As shown in FIG. 7, the process 700 begins at 702 where electrolyte is received in a reservoir, such as the reservoir 102 of FIG. 1. In such examples, the electrolyte may be provided to the reservoir 102 via one or more pumps, gravity, etc. The process 700 then proceeds to 704, where a capacitance of the electrolyte in the reservoir 102 is sensed. In various embodiments, the capacitance of the electrolyte may be sensed by one or more capacitive sensors, such as one or both of the capacitive sensors 106, 206 of FIGS. 1 and 2. In such examples, the capacitive sensor(s) transmit one or more signals to a control module, such as the control module 108 of FIGS. 1-4. The process 700 then proceeds to 706.

At 706, the control module 108 compares the capacitance of the electrolyte to a defined threshold, such as a defined threshold range as explained herein. For example, the control module 108 may compare a sensed value of the capacitance from one capacitive sensor in the reservoir 102 to the defined threshold. In other examples, the control module 108 may calculate an average capacitance value based on multiple sensed values of the same capacitive sensor or multiple capacitive sensors in the reservoir 102, and then compare the average capacitance value to the defined threshold. The process 700 then proceeds to 708.

At 708, the control module 108 determines whether the electrolyte is contaminated based on the capacitance of the electrolyte and the defined threshold. For example, if the capacitance (e.g., averaged or single value) of the electrolyte is outside a defined threshold range, the control module 108 may determine that the electrolyte is contaminated and the process 700 proceeds to 714 where a signal is generated indicating the electrolyte has failed a quality inspection. The process 700 may then end if desired. Otherwise, if the capacitance of the electrolyte is within the defined threshold range, the control module 108 may determine that the electrolyte is not contaminated and the process 700 proceeds to 710 where a signal is generated indicating the electrolyte has passed a quality inspection. The process 700 then proceeds to 712.

At 712, the electrolyte is injected into one or more battery cell(s), such as the battery cell(s) 118 of FIGS. 1-4. In various embodiments, the control module 108 may provide a signal to an electrolyte injector, such as the electrolyte injector 112 of FIG. 1 to activate a pump, open a valve, etc. to allow the electrolyte 104 to flow towards the battery cell(s) 118. The process 700 may then end if desired.

In the example process 800 of FIG. 8 is similar to the process 700 of FIG. 7, but with additional and/or alternative steps. For example, the process 800 begins at includes the steps 702, 704 as explained above relative to the process 700 of FIG. 7. Then, the process proceeds to 806, where a temperature of the electrolyte in the reservoir 102 is sensed. In various embodiments, the temperature of the electrolyte may be sensed by a temperature sensor, such as the temperature sensor 306 of FIGS. 3 and 4. In such examples, the temperature sensor 306 transmits one or more signals to the control module 108. The process 800 then proceeds to 808.

At 808, the control module 108 selects or otherwise determines a defined threshold (e.g., a defined value, a defined range, etc.) from multiple thresholds based on the temperature of the electrolyte 104. For example, multiple thresholds may be available for selection via a memory circuit in or associated with the control module 108. In such examples, the multiple thresholds may be determined based on capacitive testing of electrolyte (e.g., fresh electrolyte that is known to be adequate) at different temperatures. The process 800 then proceeds to 706, 708 as explained above relative to the process 700 of FIG. 7.

For example, at 708, the control module 108 determines whether the capacitance of the electrolyte is within a selected threshold range. If yes at 708, the process 800 of FIG. 8 proceeds to 710, 712 where a signal is generated indicating the electrolyte has passed a quality inspection and the electrolyte is injected into one or more battery cell(s), such as the battery cell(s) 118 as explained above relative to the process 700 of FIG. 7. The process 800 then proceeds to 818. If no at 708, the process 800 of FIG. 8 proceeds to 810.

At 810, the capacitance of the electrolyte in the reservoir 102 is sensed one or more additional times as explained herein. In various embodiments, the capacitance of the electrolyte may be sensed continuously, periodically, or randomly over a period of time. In other examples, the capacitance of the electrolyte may be sensed a defined number of times. In either case, the capacitance of the electrolyte may be sensed by the same capacitive sensor used to initially sense the capacitance in step 704 and/or a different capacitive sensor disposed in the reservoir 102. The process 800 of FIG. 8 then proceeds to 812.

At 812, the control module 108 monitors a trend of the capacitance over time. For example, the control module 108 may receive multiple capacitance measurements, and chart the capacitance of the electrolyte over time and monitor any profile trends of the capacitance. In such examples, the capacitance of the electrolyte may change and eventually fall within the selected threshold range or otherwise meet the defined threshold for a particular electrolyte composition. In other examples, the capacitance of the electrolyte may trend away from the selected threshold. The process 800 of FIG. 8 then proceeds to 814.

At 814, the control module 108 determines whether the electrolyte the control module 108 determines whether the capacitance of the electrolyte has changed over time and now falls within the selected threshold range. If yes at 814, the process 800 of FIG. 8 proceeds to 710 as explained above. If, however, the capacitance of the electrolyte remains outside the selected threshold range, the process 800 of FIG. 8 proceeds to 714 where a signal is generated indicating the electrolyte has failed a quality inspection as explained above. The process 800 then proceeds to 816, where the electrolyte may be discarded, replaced, or otherwise disposed of. Once disposed, the process 800 proceeds to 818 where a next batch of electrolyte is received in the reservoir 102 and/or a new tank of electrolyte is provided for testing. The process 800 then returns to 704 as shown in FIG. 8.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for monitoring the quality of electrolyte for a battery cell, the system comprising:
a reservoir configured to receive electrolyte;
a capacitive sensor disposed in the reservoir, the capacitive sensor configured to sense a capacitance of the electrolyte when received in the reservoir;
a temperature sensor disposed in the reservoir, the temperature sensor configured to sense a temperature of the electrolyte when received in the reservoir; and
a control module in communication with the capacitive sensor, the control module configured to:
receive a signal from the capacitive sensor indicative of the capacitance of the electrolyte;
receive a signal from the temperature sensor indicative of the temperature of the electrolyte;
select a capacitive threshold from a plurality of capacitive thresholds based on the sensed temperature of the electrolyte; and
determine whether the received electrolyte is contaminated based on the capacitance of the electrolyte and the selected capacitive threshold.

2. The system of claim 1, wherein:
the selected capacitive threshold is a capacitance range; and
the control module is configured to determine the received electrolyte is contaminated in response to the capacitance of the electrolyte being outside the capacitance range.

3. The system of claim 1, wherein:
the capacitive sensor is a first capacitive sensor;
the system further comprises a second capacitive sensor disposed in the reservoir and configured to sense a capacitance of the electrolyte; and
the control module is configured to receive a signal from the second capacitive sensor indicative of the capacitance of the electrolyte, and determine whether the received electrolyte is contaminated based on the capacitance received from the first capacitive sensor, the capacitance received from the second capacitive sensor, and the selected capacitive threshold.

4. The system of claim 3, wherein the control module is configured to determine whether the received electrolyte is contaminated based on the selected capacitive threshold and an average of the capacitance received from the first capacitive sensor and the capacitance received from the second capacitive sensor.

5. The system of claim 1, further comprising an electrolyte position sensor disposed in the reservoir and configured to sense the electrolyte in the reservoir, wherein the control module is configured to receive a signal from the electrolyte position sensor indicative of a level of the electrolyte in the reservoir.

6. The system of claim 1, further comprising a mixing device disposed in the reservoir, the mixing device configured to agitate the electrolyte when received in the reservoir.

7. The system of claim 1, further comprising an electrolyte injector in fluid communication with the reservoir, the electrolyte injector configured to inject the electrolyte into one or more battery cells if the control module determines that the received electrolyte is not contaminated.

8. The system of claim 1, wherein the control module is configured to monitor the capacitance of the electrolyte over a period of time and determine whether the received electrolyte is contaminated based on the capacitance of the electrolyte over the period of time and the selected capacitive threshold.

9. The system of claim 1, wherein the capacitive sensor includes two parallel electrodes.

10. The system of claim 1, wherein the capacitive sensor includes two coplanar electrodes.

11. The system of claim 1, wherein the reservoir is an electrically grounded tank.

12. The system of claim 11, wherein the tank is formed of stainless-steel.

13. A method for monitoring the quality of electrolyte in a reservoir, the method comprising:
receiving electrolyte in a reservoir;
sensing, with a capacitive sensor disposed in the reservoir, a capacitance of the electrolyte;
sensing, with a temperature sensor disposed in the reservoir, a temperature of the electrolyte;

selecting a capacitive threshold from a plurality of capacitive thresholds based on the sensed temperature of the electrolyte; and determining whether the received electrolyte is contaminated based on the capacitance of the electrolyte and the selected capacitive threshold.

14. The method of claim 13, wherein:

the selected capacitive threshold is a capacitance range; and determining whether the received electrolyte is contaminated includes determining the received electrolyte is contaminated in response to the capacitance of the electrolyte being outside the capacitance range.

15. The method of claim 13, wherein:

the capacitive sensor is a first capacitive sensor;

the method further comprises sensing, with a second capacitive sensor disposed in the reservoir, a capacitance of the electrolyte; and determining whether the received electrolyte is contaminated includes determining whether the received electrolyte is contaminated based on the selected capacitive threshold and an average of the capacitance received from the first capacitive sensor and the capacitance received from the second capacitive sensor.

16. The method of claim 13, further comprising sensing, with an electrolyte position sensor disposed in the reservoir, a level of the electrolyte in the reservoir.

17. The method of claim 13, further comprising agitating, with a mixing device, the electrolyte in the reservoir.

18. The method of claim 13, further comprising injecting the electrolyte into one or more battery cells if the received electrolyte is determined to be not contaminated.

19. A system for monitoring the quality of electrolyte for a battery cell, the system comprising:

a reservoir configured to receive electrolyte;

a first capacitive sensor disposed in the reservoir, the first capacitive sensor configured to sense a capacitance of the electrolyte when received in the reservoir;

a second capacitive sensor disposed in the reservoir, the second capacitive sensor configured to sense a capacitance of the electrolyte; and a control module in communication with the capacitive sensor, the control module configured to:

receive a signal from the first capacitive sensor indicative of the capacitance of the electrolyte;

receive a signal from the second capacitive sensor indicative of the capacitance of the electrolyte; and determine whether the received electrolyte is contaminated based on the capacitance received from the first capacitive sensor, the capacitance received from the second capacitive sensor, and a defined threshold.

20. The system of claim 19, wherein the control module is configured to determine whether the received electrolyte is contaminated based on the defined threshold and an average of the capacitance received from the first capacitive sensor and the capacitance received from the second capacitive sensor.

* * * * *